United States Patent [19]
Kuo

[11] Patent Number: 5,260,686
[45] Date of Patent: Nov. 9, 1993

[54] VARIABLE COLOR WARNING LIGHT

[76] Inventor: Yu-Chi Kuo, No. 11, Alley 22, Lane 127, Nan-Yuan St., Tainan City, Taiwan

[21] Appl. No.: 928,942

[22] Filed: Aug. 11, 1992

[51] Int. Cl.[5] ............................................. B60Q 1/44
[52] U.S. Cl. .................... 340/479; 340/464; 40/547; 362/32
[58] Field of Search ............... 340/479, 464, 467, 438; 307/10.8; 116/35 R, 202; 40/581, 591, 547; 362/32

[56] References Cited

U.S. PATENT DOCUMENTS

| | | | |
|---|---|---|---|
| 3,774,152 | 11/1973 | Tandy | 340/464 |
| 4,470,036 | 9/1984 | Doerr | 340/464 |
| 4,745,525 | 5/1988 | Sheehy | 362/32 |

Primary Examiner—Donnie L. Crosland
Assistant Examiner—Christine K. Oda
Attorney, Agent, or Firm—Darby & Darby

[57] ABSTRACT

A casing includes a display side which is provided with a plurality of through holes that form a predetermined pattern. A light generating unit is disposed in the casing, and a light receiving unit is spaced from the light generating unit. The light receiving unit includes a mounting plate, a plurality of optical fiber bundles and a motor. Each of the optical fiber bundles has a first end fixed onto the mounting plate and a second end fixed in a respective one of the through holes in the display side. The motor rotatably carries a transparent circular disc and is mounted to the mounting plate. The transparent circular disc has different colored regions.

1 Claim, 6 Drawing Sheets

VARIABLE COLOR WARNING LIGHT

BACKGROUND OF THE INVENTION

1. Field of Invention

The invention relates to a warning light, more particularly to a warning light which is installed at a rear portion of an automobile or a motorcycle and which provides a multi-colored warning sign when pressure is applied on the brake pedal of the vehicle.

2. Description of the Related Art

A conventional warning light is generally installed adjacent to a tail-light of a vehicle and it is actuated by the vehicle's brake pedal so as to provide warning signals in order to inform the driver of the following vehicle that the vehicle in front is running at a reduced speed. The warning light is an indispensable part of a vehicle. Without the warning light, the driver of the following vehicle does not have any idea whether the vehicle ahead is running at full speed or at a reduced speed, and thus a collision may possibly occur.

Referring to FIGS. 1 and 2, a conventional warning light includes a casing (1) which has a display side (11) with an opaque display plate (12) disposed thereon. The opaque display plate (12) is formed with a plurality of through holes (121) which form a predetermined pattern, such as the word "stop" and the like. A circuit board (14) is provided in a receiving space (13) within the casing (1). A plurality of light emitting diodes (15) are mounted on the circuit board (14) and are disposed adjacent to the display plate (12). The diodes(15) emit light when the brake pedal (not shown) is operated. The emitted light passes through the holes (121) of the display plate (12) so as to warn the following vehicle that the vehicle in front is running at a reduced speed. The diodes (15) emit red light, which has a relatively long wavelength and can be seen at longer distances.

A main drawback of the conventional warning light is that the single-colored red light cannot fully attract the attention of the driver of the following vehicle.

SUMMARY OF THE INVENTION

A main object of the present invention is to provide a warning light which is installed adjacent to a part, such as a tail-light, of a vehicle and which generates a multi-colored warning signal when the brake pedal is actuated thereby drawing the attention of the driver of a following vehicle in order to prevent a collision with the preceding vehicle.

According to the present invention, the warning light includes an opaque casing having a display side provided with a plurality of through holes which form a predetermined word pattern. A light generating unit, which emits light rays is disposed in the casing. A light receiving unit is also provided in the casing and is spaced from the light generating unit. The light receiving unit includes a mounting plate facing the light generating unit. It also has a plurality of optical fiber bundles, each of the optical fiber bundles having a first end fixed to the mounting plate and a second end fixed in a respective one of the through holes of the display side. A driving unit is fixed on the mounting plate and rotatably carries a circular plate which has differently-colored regions. Since the colored plate is disposed between the light generating unit and the first ends of the optical fiber bundles, light rays from a light bulb element of the light emitting unit pass through the colored plate before being received by the first ends of the optical fiber bundles. The predetermined word pattern can thus produce a multi-colored warning signal.

BRIEF DESCRIPTION OF THE DRAWINGS

Other features and advantages of the present invention will become apparent in the following detailed description, including drawings, all of which show a non-limiting form of the invention, and in which.

DETAILED DESCRIPTION OF THE PREFERRED EMBODIMENT

Figure 1:
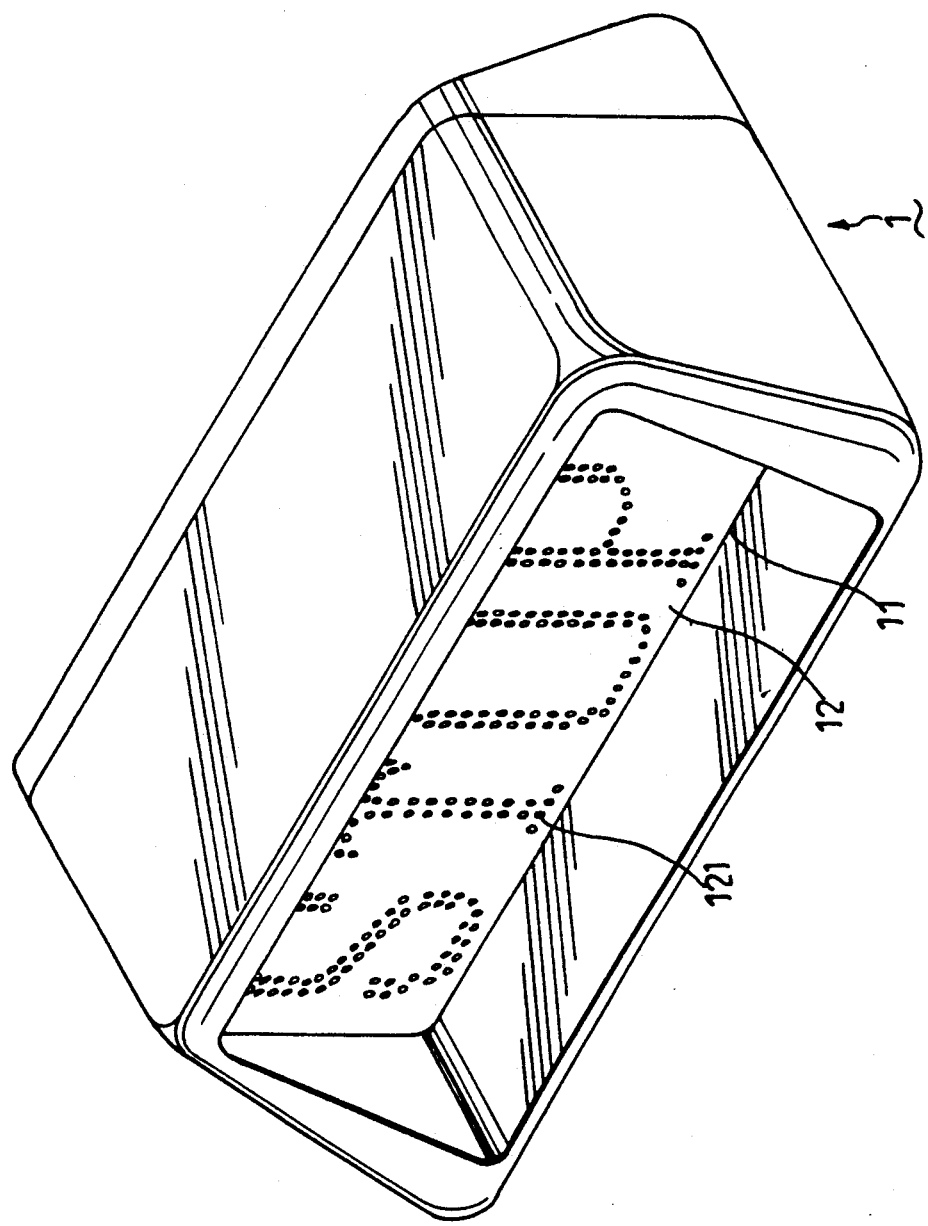
FIGS. 1 and 2 are illustrations of a conventional warning light.
Figure 2:
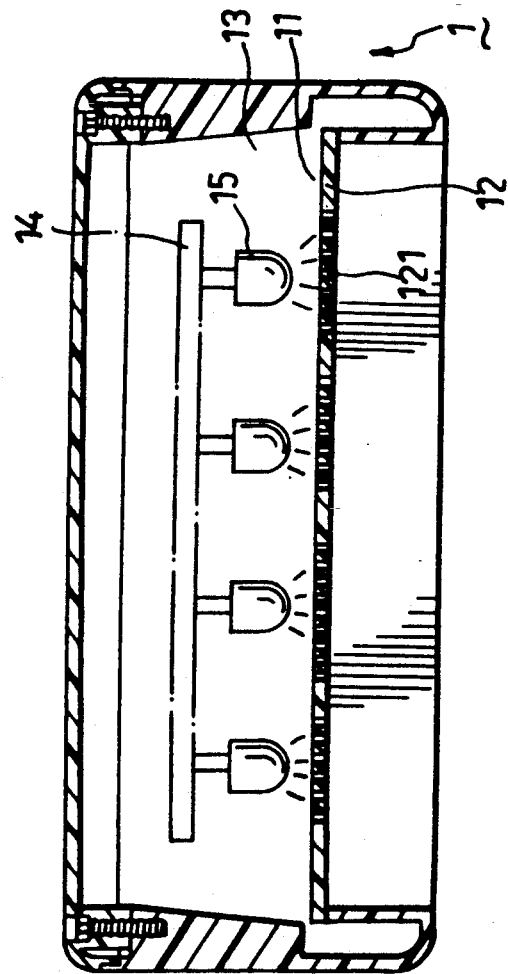
Figure 3:
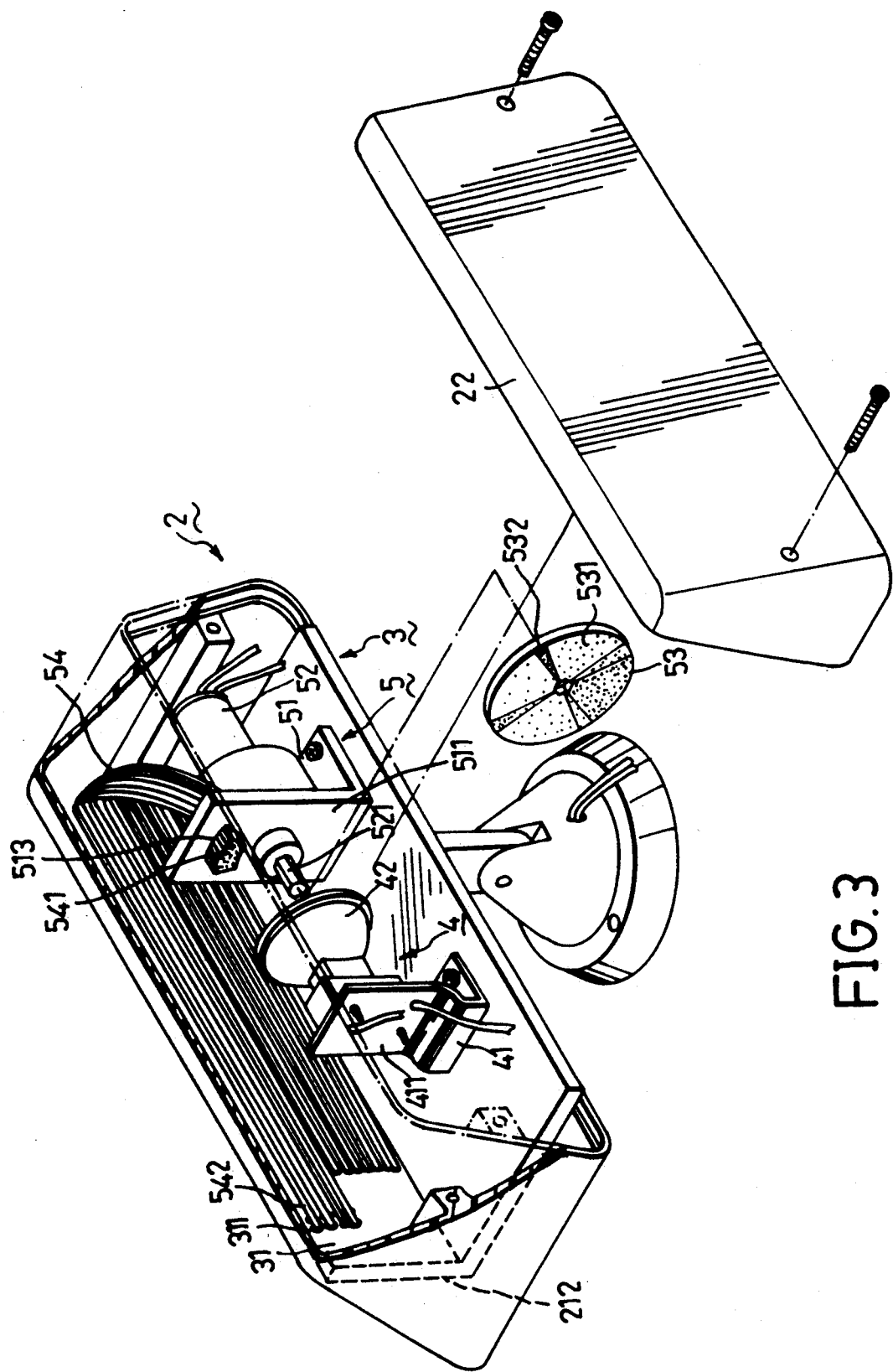
FIG. 3 shows an exploded view of a warning light of the present invention.

Referring to FIG. 3, an exploded view of a warning light of the present invention is shown to include a casing (2) which has a display side (212) with a display plate (31) that is provided with a plurality of through holes (311) which form a predetermined word pattern. The display plate (31) is made of an opaque material. The casing (2) further has an open side which is covered by a lid (22).

A light generating unit (4) is disposed in the casing (2) and includes a support base (41), a mounting plate (411) extending vertically from the support base (41), and a light bulb element (42) mounted securely on the mounting plate (411).

A light receiving unit (5) is spaced from the light generating unit (41) and includes an L-shaped mounting plate (51) mounted securely on the bottom of the casing (2), a plurality of optical fiber bundles (54) and a motor (52). Each of the optical fiber bundles (54) has a first end (541) that is fixed onto a sectoral opening (513) of the vertical part (511) of the L-shaped mounting plate (51) in a pre-arranged manner and a second end (542) that is fixed in a respective one of the through holes (311) of the display plate (31). A motor (52) is secured to the L-shaped mounting plate (51) and has a rotatable shaft (521). A transparent circular plate (53) is mounted on the shaft (521) such that the circular plate (53) rotates with the shaft (521).

The circular plate (53) has a center point from which a plurality of radial lines extend so as to divide the circular plate (53) into several sectoral portions (531, 532). Each of the sectoral portions (531, 532) has a unique color.

The transparent circular plate (53) projects a circular area on the mounting plate (51), within which the sectoral opening (513) is located. The projected circular area has center point on the mounting plate (51) which point coincides with the center point, of the circular plate (53), i.e., the shaft (521) of motor (52). The sectoral opening (513) has a periphery which includes on upper curved side and a lower curved side radially spaced from the upper curved side. The ends of the upper and lower curved sides are connected by side walls so as to confine the sectoral opening (513). The upper and lower curved sides subtend at the same angle from the center point.

Figure 4:
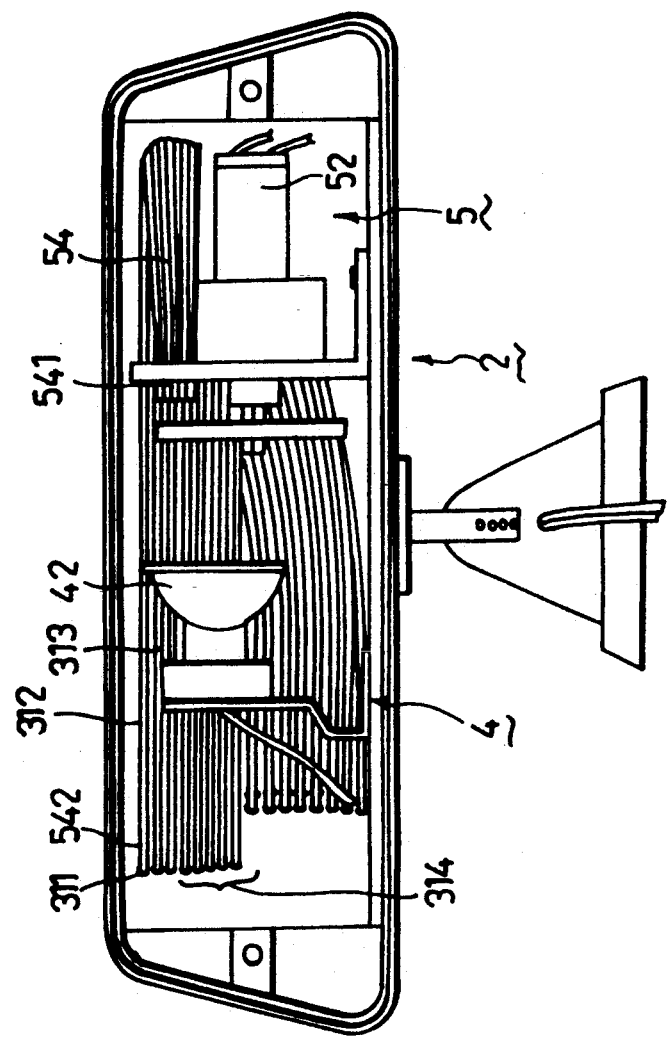
FIG. 4 shows an internal view of a casing of the warning light of the present invention.
Figure 5:
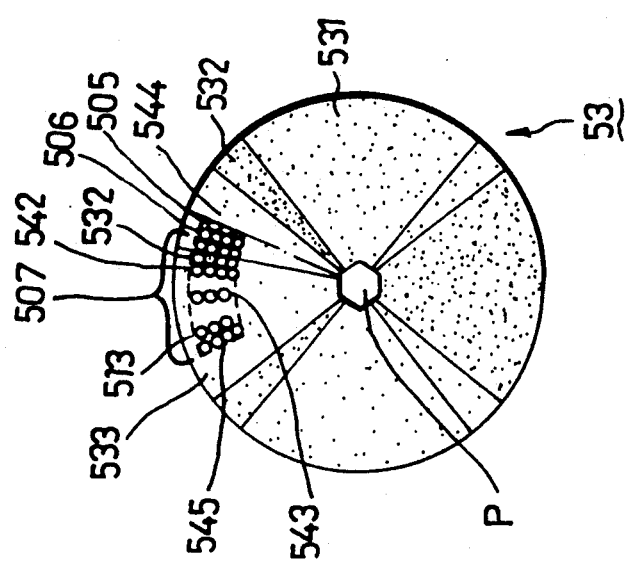
FIG. 5 shows a transparent multi-colored circular plate which is employed in the warning light of the present invention.
Figure 6:
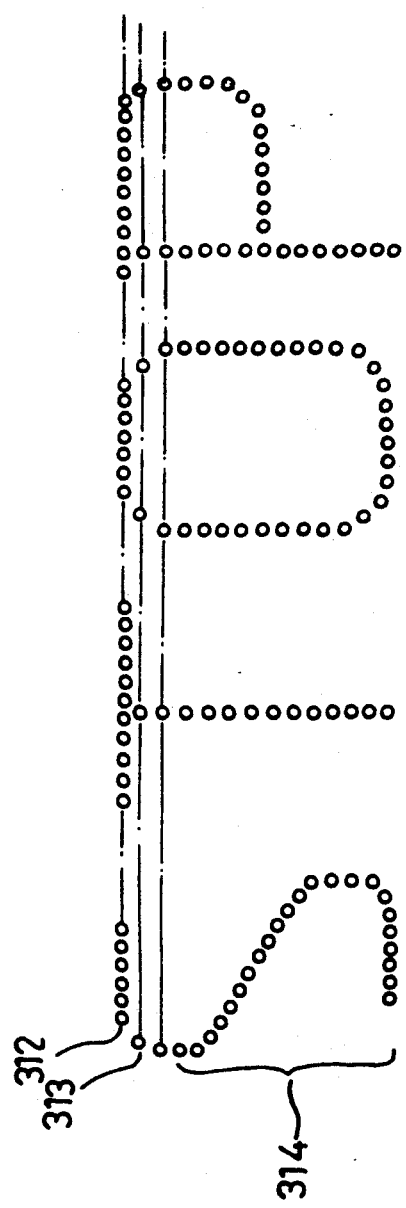
FIG. 6 shows a predetermined word pattern of the warning light of the present invention.

Referring to FIGS. 4 to 6, in the preferred embodiment, the predetermined word pattern is formed as a plurality of rows of through holes (311). Each row extends horizontally on the display plate (31) relative to the flat bottom of the casing (2) and is spaced from and is parallel to the other rows. The first ends (541) of the optical fiber bundles (54) are arranged into a plurality of radial rows (505, 506, 507) and are disposed in the sectoral opening (513). A first row (312) of second ends (542) of the optical fiber bundles (54), which second ends (542) are connected to first ends (541) in the first radial row (505) adjacent to the third straight line (544), is disposed in the topmost row of the through holes (311). A second row (313) of second ends (542) of the optical fiber bundles (54), which second ends (542) are connected to first ends (541) in a second radial row (506) next to the first radial row (505) is disposed in a row of the through holes (311) immediately below the topmost row. The remaining rows (314) of second ends (542) of the optical fiber bundles (54) are disposed below the second row (313) of second ends (542) in a sequence corresponding to the remaining radial rows (507) of first ends (541) of the optical fiber bundle (54) next to the second radial row (506). When assembled, rotation of the circular plate (53) in an anti-clockwise direction causes the color of the predetermined word pattern to change from top to bottom.

Assuming that the regions (531, 532) are colored red and green respectively, when the sectoral opening (513) falls between the regions (531, 532), as shown by phantom lines (FIG. 6) the predetermined word pattern is displayed in red and green. When the sectoral opening (513) falls entirely in red, the predetermined word pattern is shown entirely in red. In the preferred embodiment, the color of the word pattern changes from the top to the bottom due to the arrangement of the first and second ends (541, 542) of the optical fiber bundles (54) and because of the anti-clockwise rotation of the circular plate (53). Changing the color of the predetermined word pattern from left to right, or from both ends of the predetermined word pattern to the middle of the same, or from top to bottom and vice versa can be achieved by making appropriate adjustments in the arrangement of the second ends (542) of the optical fiber bundles (54) in the through holes (311) on the display plate (31).

Note that the light bulb element (42) is switched on and the motor (52) is simultaneously actuated when pressure is applied on a brake pedal (not shown). The different components which are required to permit actuation of the light bulb element (42) and the motor (52) when the brake pedal is operated are known in the art and will not be described herein.

The multi-colored warning signal which is generated by the warning light of the present invention is different from those generated by conventional warning lights thereby ensuring that the attention of a driver in the following vehicle can be drawn. An accident can therefore be avoided.

With the invention thus explained, it is obvious to those skilled in the art that various modifications and variations can be made without departing from the scope and spirit of the present invention. It is therefore intended that this claims be limited only as in the appended claims.

I claim:

1. A warning light operated by a brake pedal, comprising:

an opaque casing having a display side formed with a plurality of through holes arranged in a predetermined pattern of a plurality of spaced parallel rows;

a light generating unit mounted in said casing emitting light rays when the brake pedal is operated; and a light receiving unit spaced from said light generating unit, said light receiving unit including a mounting plate having a radial sector shaped opening formed therein to receive said light rays from said light generating unit, said sector shaped opening formed by spaced upper and lower lines which subtend the same angle relative to a point on said mounting plate and straight lines joining the ends of said upper and lower lines;

a plurality of optical fiber bundles, each of said bundles having a first end fixed in said sector shaped opening and a second end fixed in one of said through holes of said casing, said first end of each of said bundles in said sector shaped opening arranged in a plurality of radial rows relative to said mounting plate point, the second end of each of said bundles arranged in a corresponding one of said plurality of spaced parallel rows of the through holes with the disposition of the radial rows of said first end of each of said bundles corresponding to one of a left to right, top to bottom, bottom to top and end to middle sequences of the plurality of spaced parallel rows of said through holes;

a rotating drive unit mounted on said mounting plate; and a transparent circular plate having radial sectors of different colors rotatably driven by said rotating drive unit mounted between said light generating unit and said first end of each of said plurality of bundles in said sector shaped opening such that said light rays from said light generating unit pass through said rotatably driven circular plate before being received by said first end of each of said plurality of optical fiber bundles.

* * * * *